(12) United States Patent
Liu et al.

(10) Patent No.: US 11,288,638 B2
(45) Date of Patent: Mar. 29, 2022

(54) DEVICE MANAGEMENT METHOD, DEVICE MANAGEMENT SERVER AND COMPUTER READABLE STORAGE MEDIUM (71) Applicant: LAUNCH TECH CO., LTD., Guangdong (CN)

(72) Inventors: Jun Liu, Guangdong (CN); Rijun Xiao, Guangdong (CN)

(73) Assignee: LAUNCH TECH CO., LTD., Shenzhen (CN)

( * ) Notice: Subject to any disclaimer, the term of this patent is extended or adjusted under 35 U.S.C. 154(b) by 687 days.

(21) Appl. No.: 16/098,170

(22) PCT Filed: Aug. 29, 2018

(86) PCT No.: PCT/CN2018/102923
§ 371 (c)(1),
(2) Date: Nov. 1, 2018

(87) PCT Pub. No.: WO2020/042002
PCT Pub. Date: Mar. 5, 2020

(65) Prior Publication Data
US 2020/0074409 A1 Mar. 5, 2020

(51) Int. Cl.
*G06Q 10/00* (2012.01)
*H04L 29/08* (2006.01)
*H04L 67/12* (2022.01)

(52) U.S. Cl.
CPC .............. *G06Q 10/20* (2013.01); *H04L 67/12* (2013.01)

(58) Field of Classification Search
CPC .................................. G06Q 10/20; H04L 67/12
See application file for complete search history.

(56) References Cited

U.S. PATENT DOCUMENTS

| 6,023,399 A * | 2/2000 | Kogure .............. G05B 19/0421 361/115 |
| 2006/0143353 A1* | 6/2006 | Son ...................... H04N 21/443 710/302 |

(Continued)

FOREIGN PATENT DOCUMENTS

| CN | 104021453 | 9/2014 |
| CN | 104346410 | 2/2015 |

OTHER PUBLICATIONS

International Search Report of PCT/CN2018/102923 dated May 31, 2019, 5 pages.

*Primary Examiner* — Joseph H Feild
*Assistant Examiner* — Rufus C Point
(74) *Attorney, Agent, or Firm* — Rankin, Hill & Clark LLP (57) ABSTRACT

The present disclosure pertains to the technical field of shared device, and particularly to a device management method, a device management server and a computer readable storage medium, including: receiving and recording first link state information of a device uploaded by a sensing terminal at a first time; receiving and recording second link state information of the device uploaded by the sensing terminal at a second time; comparing the first device link state information with the second device link state information and determining information of a target device which is abnormal in link state; and acquiring a usage state of the target device and marking the information of the target device according to the usage state.

12 Claims, 2 Drawing Sheets

(56) References Cited

U.S. PATENT DOCUMENTS

| | | | | |
|---|---|---|---|---|
| 2007/0093975 | A1* | 4/2007 | Hoogenboom | H04L 67/12 |
| | | | | 702/35 |
| 2017/0223021 | A1* | 8/2017 | Yang | H04L 63/10 |
| 2019/0116543 | A1* | 4/2019 | Yamamoto | H04W 92/20 |
| 2019/0215898 | A1* | 7/2019 | Friedman | H04W 76/34 |
| 2019/0349728 | A1* | 11/2019 | Oppenheimer | H04W 4/33 |
| 2020/0074409 | A1* | 3/2020 | Liu | H04L 43/0811 |
| 2020/0401138 | A1* | 12/2020 | Rentz | G06Q 10/06315 |

* cited by examiner

DEVICE MANAGEMENT METHOD, DEVICE MANAGEMENT SERVER AND COMPUTER READABLE STORAGE MEDIUM

TECHNICAL FIELD

The present disclosure relates to the technical field of facilities, and more particularly to a device management method, a device management server and a computer readable storage medium.

BACKGROUND

With the continuous development of shared economy mode, devices and equipment for sharing, such as the current trend of sharing of various maintenance equipment or maintenance tools in a vehicle maintenance plant (e.g., an automobile maintenance plant), are continuously increasing. Although the sharing of various maintenance devices in the vehicle maintenance plant may bring conveniences to users, there still exist some problems in the sharing process.

The maintenance equipment and maintenance tools shared by the existing maintenance plant need to be guarded by a keeper, so that much cost needs to be paid, and a situation of loss of the maintenance equipment or maintenance tools are prone to occur in the case that the user and the keeper are not the same person. Otherwise, the maintenance devices are prone to be stolen if they are not guarded, and both the management cost and the management efficiency are much lower.

SUMMARY

In view of this, embodiments of the present disclosure provides a device manager, a device management server and a computer readable storage medium, which aims at solving a problem that the management efficiency is low due to the fact that the devices shared by the existing maintenance plant are dependent on labor management.

In a first aspect, the embodiments of the present disclosure provide a device management method, comprising:

receiving and recording first link state information of a device uploaded by a sensing terminal at a first time; receiving and recording second link state information of the device uploaded by the sensing terminal at a second time; comparing the first device link state information with the second device link state information and determining information of a target device which is abnormal in link state; and acquiring a usage state of the target device and marking the information of the target device according to the usage state.

Optionally, before the receiving and recording second link state information of the device uploaded by the sensing terminal at a second time, the method further comprises:

receiving a specific device use request sent by a client, wherein the specific device use request includes specific device identification; granting a permission of usage of the specific device according to the specific device use request;

the step of acquiring a usage state of the target device and marking the information of the target device according to the usage state comprises:

acquiring a target device identification in the target device information; analyzing whether the target device identification is consistent with the specific device identification or not; determining, if the target device identification is consistent with the specific device identification, the specific device as the target device which is in usage state, and marking the information of the target device as being in normal use; determining, if the target device identification is inconsistent with the specific device identification, that the specific device is not the target device and that the target device is in abnormal usage state, and marking the information of the target device as being in abnormal use.

Optionally, when the target device is in usage state, the method further comprises:

receiving a request for ending use of the target device sent by the client; receiving target device link state information uploaded by the sensing terminal; analyzing whether the connection state is normal or not; and determining that the use of the target device is ended in the case that the connection state is normal.

Optionally, when the connection state is determined as being abnormal, the method further comprises:

controlling the sensing terminal to send warning information; and sending prompt information of placing the target device within a designated area to the client to remind a user of the client.

Optionally, when the target device is in an abnormal usage state, the method further comprises:

controlling the sensing terminal to send warning information; and sending the abnormal usage state information of the target device to a device manager.

In a second aspect, embodiments of the present disclosure provide a device management server, comprising: a memory which stores executable computer program; a processor coupled with the memory, wherein the processor is configured to call the executable computer program in the memory to: receive and record first link state information of a device uploaded by a sensing terminal at a first time; and receive and record second link state information of the device uploaded by the sensing terminal at a second time; compare the first device link state information with the second device link state information and determine information of a target device which is abnormal in link state; and acquire a usage state of the target device, and mark the information of the target device according to the usage state.

Optionally, before the device management server receives and records second link state information of the device uploaded by the sensing terminal at a second time, the processor is further configured to call the executable computer program in the memory to: receive a specific device use request sent by a client, wherein the specific device use request comprises specific device identification; grant a permission of usage of the specific device according to the specific device use request; the step of acquiring a usage state of the target device and marking the information of the target device according to the usage state particularly comprises: acquiring a target device identification in the target device information; analyzing whether the target device identification is consistent with the specific device identification or not; determining, if the target device identification is consistent with the specific device identification, the specific device as the target device which is in usage state, and marking the information of the target device as being in normal use; determining, if the target device identification is inconsistent with the specific device identification, that the specific device is not the target device and that the target device is in abnormal usage state, and marking the information of the target device as being in abnormal use.

Optionally, when the target device is in usage state, the processor is further configured to call the executable computer program in the memory to: receive a request for ending use of the target device sent by the client; receive target device link state information uploaded by the sensing terminal; analyze whether the connection state is normal or not;

and determine that the use of the target device is ended in the case that the connection state is normal.

Optionally, when the connection state is determined as being abnormal, the processor is further configured to call the executable computer program in the memory to:

control the sensing terminal to send warning information; and send prompt information of placing the target device within a designated area to the client to remind a user of the client.

Optionally, when the target device is in an abnormal usage state, the processor is further configured to call the executable computer program in the memory to:

control the sensing terminal to send warning information; and send the abnormal usage state information of the target device to a device manager.

In a third aspect, embodiments of the present disclosure provide a computer readable storage medium which stores computer program, the computer program is executable to implement the following steps of:

receiving and recording first link state information of a device uploaded by a sensing terminal at a first time; receiving and recording second link state information of the device uploaded by the sensing terminal at a second time; comparing the first device link state information with the second device link state information and determining information of a target device which is abnormal in link state; and acquiring a usage state of the target device and marking the information of the target device according to the usage state.

Optionally, before the receiving and recording second link state information of the device uploaded by the sensing terminal at a second time, the computer program is executed to further implement the following steps of:

receiving a specific device use request sent by a client, wherein the specific device use request includes specific device identification; granting a permission of usage of the specific device according to the specific device use request;

the step of acquiring a usage state of the target device and marking the information of the target device according to the usage state comprises: acquiring a target device identification in the target device information; analyzing whether the target device identification is consistent with the specific device identification or not; determining, if the target device identification is consistent with the specific device identification, the specific device as the target device which is in usage state, and marking the information of the target device as being in normal use; determining, if the target device identification is inconsistent with the specific device identification, that the specific device is not the target device and that the target device is in abnormal usage state, and marking the information of the target device as being in abnormal use.

Optionally, when the target device is in usage state, the computer program is executed to further implement the following steps of:

receiving a request for ending use of the target device sent by the client; receiving target device link state information uploaded by the sensing terminal; analyzing whether the connection state is normal or not; and determining that the use of the target device is ended in the case that the connection state is normal.

Optionally, when the connection state is determined as being abnormal, the computer program is executed to further implement the following steps of:

controlling the sensing terminal to send warning information; and sending prompt information of placing the target device within a designated area to the client to remind a user of the client.

Optionally, when the target device is in an abnormal usage state, the computer program is executed to further implement the following steps of:

controlling the sensing terminal to send warning information; and sending the abnormal usage state information of the target device to a device manager.

In this embodiment provided by the present disclosure, the device management server receives the first link state information of device uploaded by the sensing terminal, receives and records the second link state information of the device uploaded by the sensing terminal after a period of time, and compares the twice recorded link state information of the device to determine the information of the target device which is abnormal in link state, and then mark the target device information according to the usage state of the target device. In this process, the target device with an abnormal connection state is determined according to device connection information uploaded by the sensing terminal at different time points, and then a marking is performed on the target device correspondingly according to the usage state of the target device; in this way, the state of each device can be ensured to be recorded by the system at any time and the loss of device is avoided.

BRIEF DESCRIPTION OF THE DRAWINGS

In order to explain the embodiments of the present disclosure more clearly, a brief introduction regarding the accompanying drawings that need to be used for describing the embodiments of the present disclosure or the prior art is given below.

EMBODIMENTS OF THE PRESENT DISCLOSURE

In order to make the purpose, the technical solution and the advantages of the present disclosure be clearer and more understandable, the present disclosure is further described in detail below with reference to accompanying figures and embodiments. It should be understood that, the embodiments described in detail herein are only intended to explain the present disclosure but not to limit the present disclosure. Meanwhile, in the descriptions of the present disclosure, terms such as "first" and "second", etc., are only intended to distinguish in description, but shouldn't be interpreted as indicating or implying a relative importance. In some other conditions, detailed explanations of device, system, circuit, method well known to the public are omitted, such that unnecessary details can be prevented from obstructing the description of the present disclosure.

Figure 1:
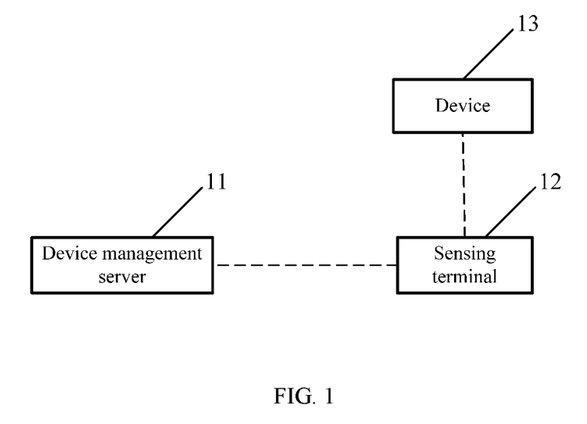
FIG. 1 illustrates a structural schematic view of a device management system provided by an embodiment of the present disclosure.

FIG. 1 illustrates a schematic structural view of a device management system provided by an embodiment of the present disclosure, the device management system is applicable for the management of various maintenance equipment or maintenance tools (collectively referred to as device) in shared maintenance plants, and includes an sensing terminal 11, a device management server 12 and various devices 13, wherein, each of the devices 13 is provided with a connection module. The device management server 11 is connected with the sensing terminal 12 to realize communication, the sensing terminal 12 reads information from the connection module of the device 13, and send the read information to the device management server 11.

In order to describe the technical solution of the present disclosure, the present disclosure will be described below with reference to specific embodiments.

Embodiment One

Figure 2:
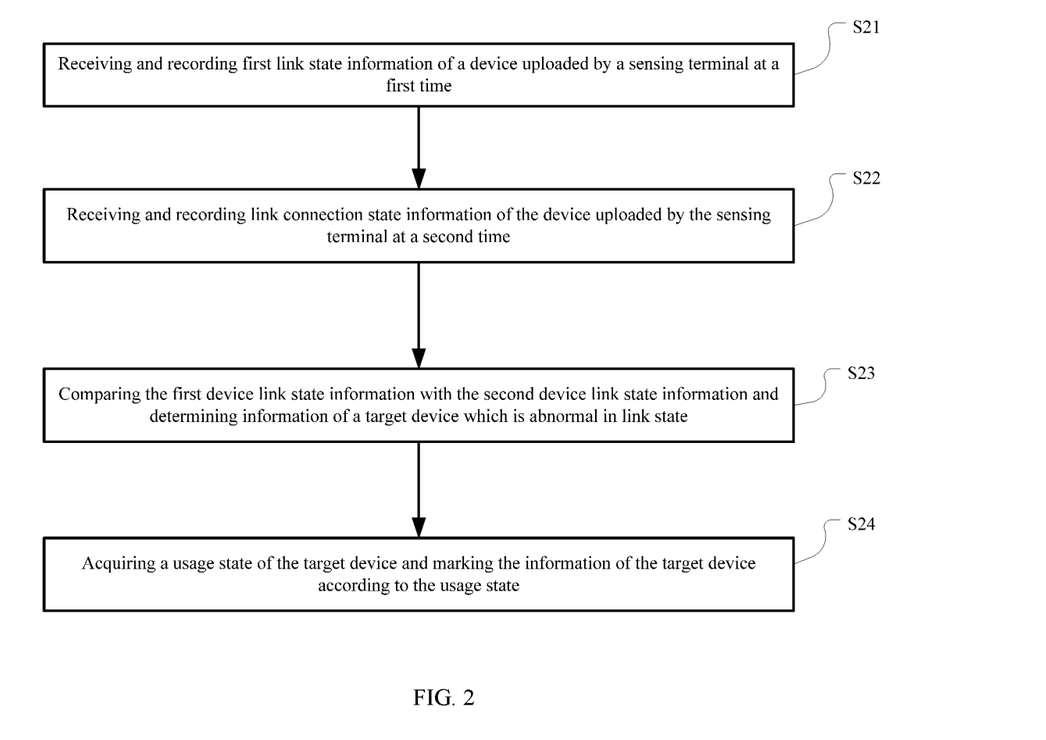
FIG. 2 illustrates an implementation schematic flow chart of a device management method provided by an embodiment of the present disclosure.

FIG. 2 illustrates a flow chart of a device management method provided by an embodiment of the present disclosure, which includes steps 21-24, and are described in detail as follows:

step 21, receiving and recording first link state information of a device uploaded by a sensing terminal at a first time.

This embodiment provided by the present disclosure are applicable to the management of various maintenance equipment or maintenance tools (collectively referred to as devices) in a shared maintenance plant, the management system of the shared maintenance plant is provided therein with a device management server which serves to receive the link state information of the device uploaded by the sensing terminal at the first time. The equipment herein includes a plurality of various kinds of devices. Each device has a built-in connection module and the connection module can be connected with the sensing terminal through a short-distance communication mode. The connection module can be an electronic tag RFID, an infrared module, a Bluetooth module or a Wi-Fi module; correspondingly, the connection mode between the sensing terminal and connection module can be a radio frequency connection, an infrared connection, a Bluetooth connection or a Wi-Fi connection. The adoption of the short-distance communication mode facilitates the user in judging whether the device is disconnected or not according to the distance. After connecting with the connection module of the device, the sensing terminal reads corresponding link state information (referred to herein as first link state information) from the device and sends it to the device management server to be recorded and stored.

Step 22, receiving and recording second link state information of the device uploaded by the sensing terminal at a second time.

In this step, after a period of time, the sensing terminal uploads the link state information (referred to as the second link state information) of the device to the device management server again. For example, when the device is a landing gear, a connecting module is arranged in the landing gear, after sensing the link state information as sent by the landing gear at the current time point, the sensing terminal sends the link state information to the device management server, after a period of time (e.g., after one second), the sensing terminal senses the link state information of the landing gear again and sends the link state information to the device management server which records the received link state information of the device every time.

It should be noted that, the second time can be a time point where there is an interval period that reaches a preset time between the time point and the first time, the second time can also be considered as the next time unit point of the first time (e.g., the next second) uploaded in real time according to the sensing terminal, and can also be other time points set by a user.

Step 23, comparing the first link state information of the device with the second link state information of the device, and determining information of a target device which is abnormal in link state.

In this step, the device management server compares the twice recorded link state information of the device to determine the abnormality according to the change information in two connection states. For example, when the link state information refers to single device, whether the device is normal or not is determined according to whether the second connection state is changed as compared to the first connection state; just like, if the connection information of the device is changed from a strong connection state of the first connection state to a weak connection or a connectionless of the second connection state, or if the connection information of the device is changed from the weak connection of the first connection state to the connectionless of the second connection state, it means that the device is abnormal. When the link state information refers to a plurality of connection devices, whether these devices with the change of connection states are abnormal or not is determined according to these devices with the change of connection states in the plurality of devices, the judgment rules of these devices are the same as that of single device.

Step 24, acquiring a usage state of the target device and marking target device information according to the usage state.

In this step, the usage state (e.g., whether the target device is borrowed by some users or not) of the target device in the step 23 is obtained, and a mark is made according to the usage state of the target device correspondingly; if the device is used, the device is marked as being used, if the target device is not used, the device is marked as lost, of course, a mark can also be made in other manners as needed.

Optionally, in another embodiment provided by the present disclosure, before receiving and recording the second link state information of the device uploaded by the sensing terminal at the second time, the method further comprises:

receiving a specific device use request sent by a client, the specific device use request includes a particular device identification; granting a permission of usage of the specific device according to the specific device use request; correspondingly, said acquiring the usage state of the target device and marking the information of the target device according to the usage state particularly comprises: acquiring a target device identification in the target device information; analyzing whether the target device identification is consistent with a specific device identification or not; determining the specific device as the target device which is in a usage state, and marking the target device information as normal use, if the target device identification is consistent with the specific device identification; determining that the specific device is not the target device, and that the target device is in an abnormal usage state, and marking the target device information as abnormal use, if the target device identification is inconsistent with the specific device identification.

In this embodiment provided by the present disclosure, after the first time and before the second time, the device management server can receive the specific device use request from the user, the aforesaid specific device refers to the device which needs to be used by the user in the devices that can be provided by a maintenance plant. After the device management server verifies the identity of the user (e.g., whether the user is registered or not, and whether the credit rating of the user is qualified or not), if the user meets a usage condition of the specific device, the permission of usage of the specific device is then released to the user.

Accordingly, when the target device is marked after the second device connection state is received, the acquired device identification of the target device is compared with the device identification of the specific device, if the acquired device identification of the target device is consistent with the device identification of the specific device, it indicates that the specific device is the target device; at this moment, the target device information is marked as normally used state. If the acquired device identification of the target device is inconsistent with the device identification of the specific device, the specific device is considered not to be the target device, and the connection state of the target device is abnormal, so that the target device information can be directly marked as an abnormal usage state.

Optionally, in another embodiment provided by the present disclosure, when the target device is in the abnormal usage state, the method further comprises:

controlling the sensing terminal to send warning information; sending the abnormal usage state information of the target device to a device manager.

In this step, if the target device is detected to be in the abnormal state, the abnormal usage state information of the target device can be directly sent to the device manager, such that the device manager can record the target device or perform other operations on the target device.

Optionally, in another embodiment provided by the present disclosure, when the target device is in the usage state, the method further comprises:

receiving a request for ending use of the target device sent by the client; receiving the link state information of the target device uploaded by the sensing terminal; analyzing whether the connection state is normal or not; and confirming that the use of the target device is ended in the case that the connection state is normal.

In this step, after the user utilizes the target device, when he/she returns the target device and makes a settlement, the request for ending use is sent to the device management server, and the target device link state information uploaded by the sensing terminal is continuously received, if the target device is in the normal connection state, it is confirmed that the user has finished the use of the target device this time, and the user can make the settlement.

Optionally, in another embodiment provided in the present disclosure, if the connection state is determined as being abnormal, the method further comprises:

controlling the sensing terminal to send warning information; sending prompt information of placing the target device within a designated area to the client to remind the client.

In this step, after the user sends the request for ending use, if the device management server judges that the target device is in the abnormal connection state, the sensing terminal is controlled to send warning information; for example, if the sensing terminal module is instructed to give an alarm, the mode of alarm can be in the form of ringing alarm and/or flashing indicator alarm.

Meanwhile, prompt information is sent to the client where the user is located, the user is reminded of placing the target device in the correct position, or a prompt of inquiring whether the target device needs to be continuously used or not is sent to the user, if the device continues to be used, charging is continuously performed, and a end of use is confirmed until the target device is determined to be located within the designated area according to the acquired link state information. In addition, if the target device is still not located in the designated position in the case that the preset time expires, the target device information and the client side user information are sent to the device manager.

In this embodiment provided by the present disclosure, the device management server receives the first link state information of device uploaded by the sensing terminal, receives and records the second link state information of the device uploaded by the sensing terminal after a period of time, and compares the twice recorded link state information of the device to determine the information of the target device which is abnormal in link state, and then mark the target device information according to the usage state of the target device. In this process, the target device with an abnormal connection state is determined according to device connection information uploaded by the sensing terminal at different time points, and then a marking is performed on the target device correspondingly according to the usage state of the target device; in this way, the state of each device can be ensured to be recorded by the system at any time and the loss of device is avoided.

Embodiment Two

The implementation process of the device management method provided by the present disclosure is described by taking a spanner as an example, a tag which can send signals such as an electronic tag, etc., can be arranged in the spanner in advance; when the spanner is placed normally, the electronic tag in the spanner sends connection state signal to be received by the sensing terminal, the sensing terminal takes the currently received connection state signal as the first link state information and uploads it to the device management server, and continues to monitor the connection state sent by the spanner, and takes the additionally monitored connection state signal as the second link state information and upload it to the device management server. The device management server compares the twice received link state information to determine the state of the spanner; if the signal strength of the second connection information is reduced relative to the signal strength of the first link state information, or as an alternative, the second link state information is disconnected signal, the spanner is considered to be not within the designated area. In addition, whether the spanner is borrowed or lost can be further determined according to whether there is a borrowing record of the spanner.

Embodiment Three

Figure 3:
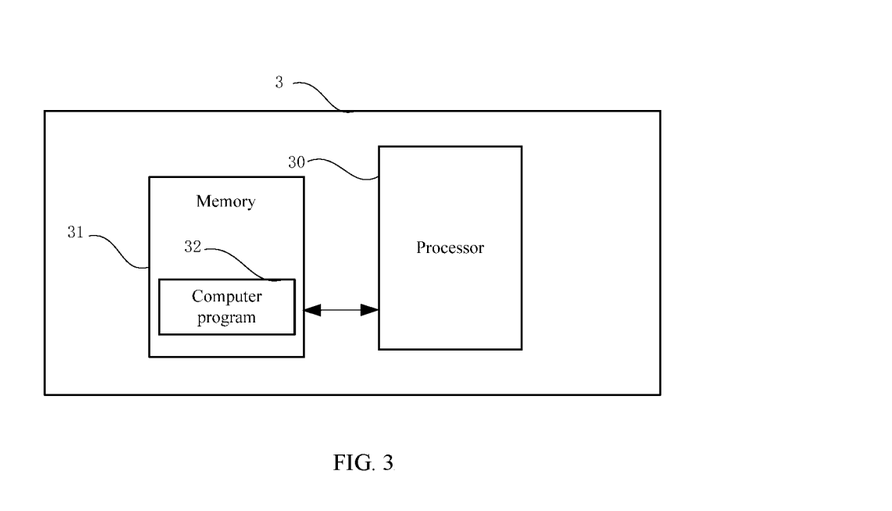
FIG. 3 illustrates a structural schematic view of a device management server provided by an embodiment of the present disclosure.

Corresponding to the aforesaid embodiment one, the present disclosure further provides a device management server, please refer to FIG. 3, the device management server comprises:

a memory 31 which stores executable computer program;

a processor 30 coupled with the memory 31, the processor 30 is configured to call the executable computer program 32 in the memory 31 to:

receive and record first link state information of a device uploaded by a sensing terminal at a first time; receive and record second link state information of the device uploaded by the sensing terminal at a second time;

compare the first device link state information with the second device link state information and determine information of a target device which is abnormal in link state; and acquire a usage state of the target device and mark the information of the target device according to the usage state.

Optionally, before the device management server receives and record second link state information of the device uploaded by the sensing terminal at a second time, the processor 30 is further configured to call the executable computer program in the memory 31 to:

receive a specific device use request sent by a client, the specific device use request comprises specific device identification; grant a permission of usage of the specific device according to the specific device use request; said acquiring a usage state of the target device and marking the information of the target device according to the usage state particularly comprises: acquiring a target device identification in the target device information; analyzing whether the target device identification is consistent with the specific device identification or not; determining, if the target device identification is consistent with the specific device identification, the specific device as the target device which is in usage state, and marking the information of the target device as being in normal use; determining, if the target device identification is inconsistent with the specific device identification, that the specific device is not the target device, and that the target device is in abnormal usage state, and marking the information of the target device as being in abnormal use.

Optionally, when the target device is in usage state, the processor 30 is further configured to call the executable computer program in the memory 31 to:

receive a request for ending use of the target device sent by the client; receive target device link state information uploaded by the sensing terminal; analyze whether the connection state is normal or not; and determine that the use of the target device is ended in the case that the connection state is normal.

Optionally, when the connection state is determined as being abnormal, the processor 30 is further configured to call the executable computer program in the memory 31 to:

control the sensing terminal to send warning information; and send prompt information of placing the target device within a designated area to the client to remind a user of the client.

Optionally, when the target device is in an abnormal usage state, the processor 30 is further configured to call the executable computer program in the memory 31 to:

control the sensing terminal to send warning information; and send the abnormal usage state information of the target device to a device manager.

Embodiment Four

Corresponding to the aforesaid device management method or the aforesaid device management server, the present disclosure further provides a computer readable storage medium which stores computer program, the computer program is executable to implement the steps of:

receiving and recording first link state information of a device uploaded by a sensing terminal at a first time;

receiving and recording second link state information of the device uploaded by the sensing terminal at a second time;

comparing the first device link state information with the second device link state information and determining information of a target device which is abnormal in link state; and acquiring a usage state of the target device and marking the information of the target device according to the usage state.

Optionally, before said receiving and recording second link state information of the device uploaded by the sensing terminal at a second time, the computer program is executed to further implement the following steps of:

receiving a specific device use request sent by a client, wherein the specific device use request comprises specific device identification; granting a permission of usage of the specific device according to the specific device use request; said acquiring a usage state of the target device and marking the information of the target device according to the usage state comprises: acquiring a target device identification in the target device information; analyzing whether the target device identification is consistent with the specific device identification or not; determining, if the target device identification is consistent with the specific device identification, the specific device as the target device which is in usage state, and marking the information of the target device as being in normal use; determining, if the target device identification is inconsistent with the specific device identification, that the specific device is not the target device, and that the target device is in abnormal usage state, and marking the information of the target device as being in abnormal use.

Optionally, when the target device is in usage state, the computer program is executed to further implement the following steps of:

receiving a request for ending use of the target device sent by the client; receiving target device link state information uploaded by the sensing terminal; analyzing whether the connection state is normal or not; and determining that the use of the target device is ended in the case that the connection state is normal.

Optionally, when the connection state is determined as being abnormal, the computer program is executed to further implement the following steps of:

controlling the sensing terminal to send warning information; and sending prompt information of placing the target device within a designated area to the client to remind a user of the client.

Optionally, when the target device is in an abnormal usage state, the computer program is executed to further implement the following steps of:

controlling the sensing terminal to send warning information, and sending the abnormal usage state information of the target device to a device manager.

It can be clearly understood by the ordinarily skilled one in the art that, for describing conveniently and concisely, regarding a specific working process of the descriptions, reference can be made to a corresponding process in the aforesaid method embodiments, it is not repeatedly described herein.

It should be understood that, in the embodiments of the present disclosure, the disclosed system, server, and method could be implemented in other ways. The modules described as separate components could or could not be physically separate, the components shown as modules could or could not be physical modules. A part or a whole of the modules could be selected according to the actual need to achieve the object of the technical solution of this embodiment.

If the functionalities are achieved in the form of software functional units, and are sold or used as an independent product, they can be stored in a computer readable storage medium. Based on this understanding, the technical solution of the present disclosure, or the part that is contributable to related art, or a part of the technical solution can be embodied in the form of software product essentially, the computer softer product is stored in a storage medium and includes an instruction that enables a computer device (which can be a personal computer, a server, or a network device, and the like) to execute all or part of steps of methods in the various embodiments of the present disclosure. The aforesaid storage medium includes: various mediums capable of storing program codes such as USB flash disk, mobile hard disk, computer storage device, ROM (Read-Only Memory), RAM (Random Access Memory), hard disk, optical disk, and the like.

The aforementioned embodiments are only preferred embodiments of the present disclosure, and should not be regarded as being limitation to the present disclosure. Any modification, equivalent replacement, improvement, and so on, which are made within the spirit and the principle of the present disclosure, should be included in the protection scope of the present disclosure.

What is claimed is:

1. A device management method, comprising:
   receiving and recording first link state information of a device uploaded by a sensing terminal at a first time;
   receiving and recording second link state information of the device uploaded by the sensing terminal at a second time;
   comparing the first device link state information with the second device link state information and determining information of a target device which is abnormal in link state; and
   acquiring a usage state of the target device and marking the information of the target device according to the usage state;
   wherein before the receiving and recording second link state information of the device uploaded by the sensing terminal at a second time, the method further comprises:
   receiving a specific device use request sent by a client, wherein the specific device use request includes a specific device identification;
   granting a permission of usage of the specific device according to the specific device use request;
   the step of acquiring a usage state of the target device and marking the information of the target device according to the usage state comprises:
   acquiring a target device identification in the target device information;
   analyzing whether the target device identification is consistent with the specific device identification or not;
   determining, if the target device identification is consistent with the specific device identification, the specific device as the target device which is in usage state, and marking the information of the target device as being in normal use;
   determining, if the target device identification is inconsistent with the specific device identification, that the specific device is not the target device and that the target device is in abnormal usage state, and marking the information of the target device as being in abnormal use.

2. The method according to claim 1, when the target device is in usage state, the method further comprises:
   receiving a request for ending use of the target device sent by the client;
   receiving target device link state information uploaded by the sensing terminal;
   analyzing whether the connection state is normal or not; and
   determining that the use of the target device is ended in the case that the connection state is normal.

3. The method according to claim 2, wherein when the connection state is determined as being abnormal, the method further comprises:
   controlling the sensing terminal to send warning information; and
   sending prompt information of placing the target device within a designated area to the client to remind a user of the client.

4. The method according to claim 1, wherein when the target device is in abnormal usage state, the method further comprises:
   controlling the sensing terminal to send warning information; and
   sending abnormal usage state information of the target device to a device manager.

5. A device management server, comprising:
   a memory which stores executable computer program;
   a processor coupled with the memory, wherein the processor is configured to call the executable computer program in the memory to:
   receive and record first link state information of a device uploaded by a sensing terminal at a first time; and
   receive and record second link state information of the device uploaded by the sensing terminal at a second time;
   compare the first device link state information with the second device link state information and determine information of a target device which is abnormal in link state; and
   acquire a usage state of the target device, and mark the information of the target device according to the usage state;
   wherein before the device management server receives and record second link state information of the device uploaded by the sensing terminal at a second time, the processor is further configured to call the executable computer program in the memory to:
   receive a specific device use request sent by a client, wherein the specific device use request comprises a specific device identification;
   grant a permission of usage of the specific device according to the specific device use request;
   the step of acquiring a usage state of the target device and marking the information of the target device according to the usage state particularly comprises:
   acquiring a target device identification in the target device information;
   analyzing whether the target device identification is consistent with the specific device identification or not;
   determining, if the target device identification is consistent with the specific device identification, the specific device as the target device which is in usage state, and marking the information of the target device as being in normal use;
   determining, if the target device identification is inconsistent with the specific device identification, that the specific device is not the target device and that the target device is in abnormal usage state, and marking the information of the target device as being in abnormal use.

6. The device management server according to claim 5, wherein when the target device is in usage state, the processor is further configured to call the executable computer program in the memory to:
   receive a request for ending use of the target device sent by the client;
   receive target device link state information uploaded by the sensing terminal;
   analyze whether the connection state is normal or not; and determine that the use of the target device is ended in the case that the connection state is normal.

7. The device management server according to claim 6, wherein when the connection state is determined as being abnormal, the processor is further configured to call the executable computer program in the memory to:
  control the sensing terminal to send warning information; and
  send prompt information of placing the target device within a designated area to the client to remind a user of the client.

8. The device management server according to claim 5, wherein when the target device is in abnormal usage state, the processor is further configured to call the executable computer program in the memory to:
  control the sensing terminal to send warning information; and
  send abnormal usage state information of the target device to a device manager.

9. A non-transitory computer readable storage medium which stores computer program, wherein the computer program is executable by a processor to implement the following steps of:
  receiving and recording first link state information of a device uploaded by a sensing terminal at a first time;
  receiving and recording second link state information of the device uploaded by the sensing terminal at a second time;
  comparing the first device link state information with the second device link state information and determining information of a target device which is abnormal in link state; and
  acquiring a usage state of the target device and marking the information of the target device according to the usage state;
  wherein before the receiving and recording second link state information of the device uploaded by the sensing terminal at a second time, the computer program is executed to further implement the following steps of:
  receiving a specific device use request sent by a client, wherein the specific device use request includes a specific device identification;
  granting a permission of usage of the specific device according to the specific device use request;
  the step of acquiring a usage state of the target device and marking the information of the target device according to the usage state comprises:
  acquiring a target device identification in the target device information;
  analyzing whether the target device identification is consistent with the specific device identification or not;
  determining, if the target device identification is consistent with the specific device identification, the specific device as the target device which is in usage state, and marking the information of the target device as being in normal use;
  determining, if the target device identification is inconsistent with the specific device identification, that the specific device is not the target device and that the target device is in abnormal usage state, and marking the information of the target device as being in abnormal use.

10. The non-transitory computer readable storage medium according to claim 9, wherein when the target device is in usage state, the computer program is executed by the processor to further implement the following steps of:
  receiving a request for ending use of the target device sent by the client;
  receiving target device link state information uploaded by the sensing terminal;
  analyzing whether the connection state is normal or not; and
  determining that the use of the target device is ended in the case that the connection state is normal.

11. The non-transitory computer readable storage medium according to claim 10, wherein when the connection state is determined as being abnormal, the computer program is executed by the processor to further implement the following steps of:
  controlling the sensing terminal to send warning information; and
  sending prompt information of placing the target device within a designated area to the client to remind a user of the client.

12. The non-transitory computer readable storage medium according to claim 9, wherein when the target device is in abnormal usage state, the computer program is executed by the processor to further implement the following steps of:
  controlling the sensing terminal to send warning information; and
  sending abnormal usage state information of the target device to a device manager.

* * * * *